United States Patent Office 3,492,616
Patented Jan. 27, 1970

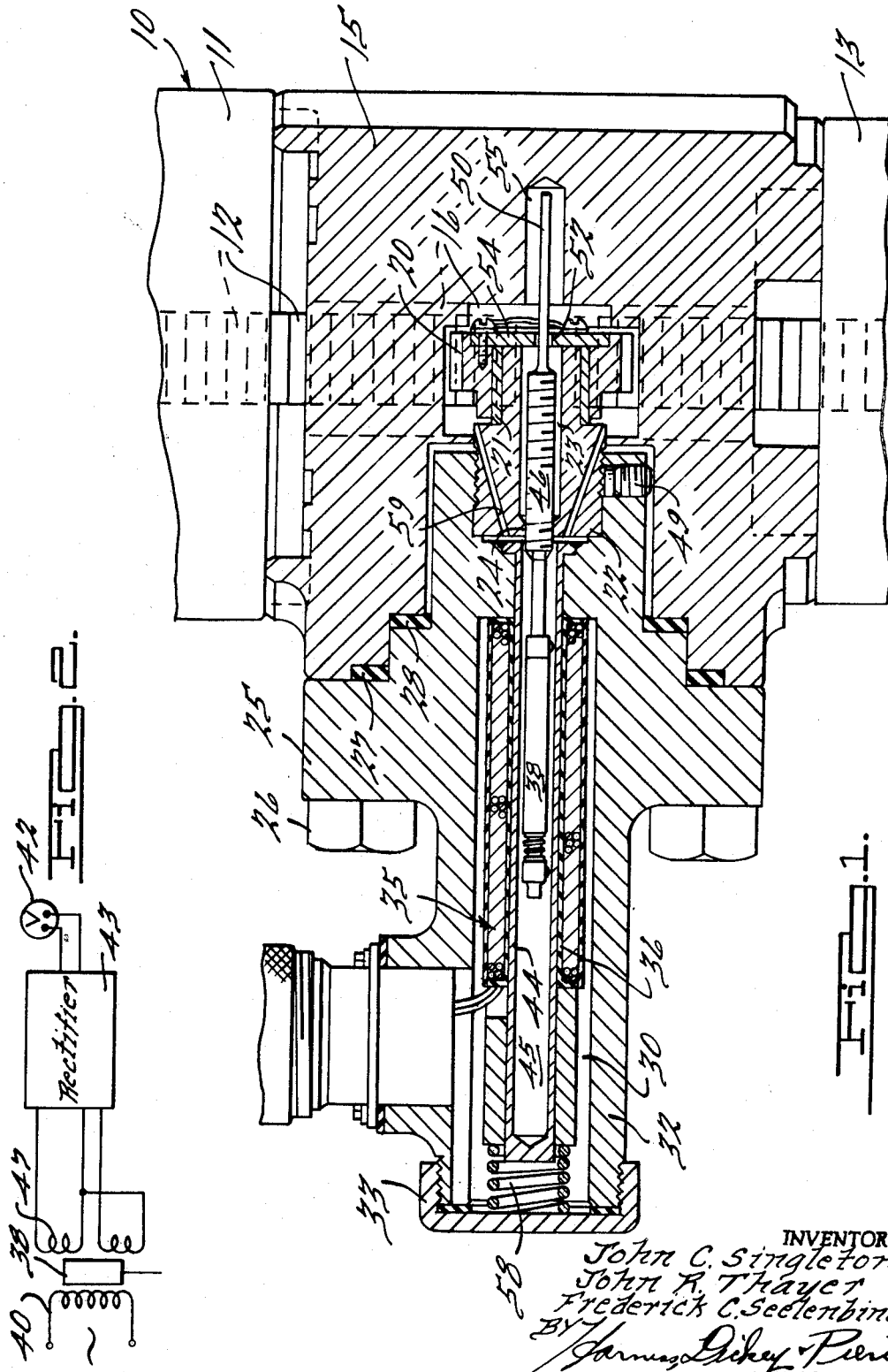

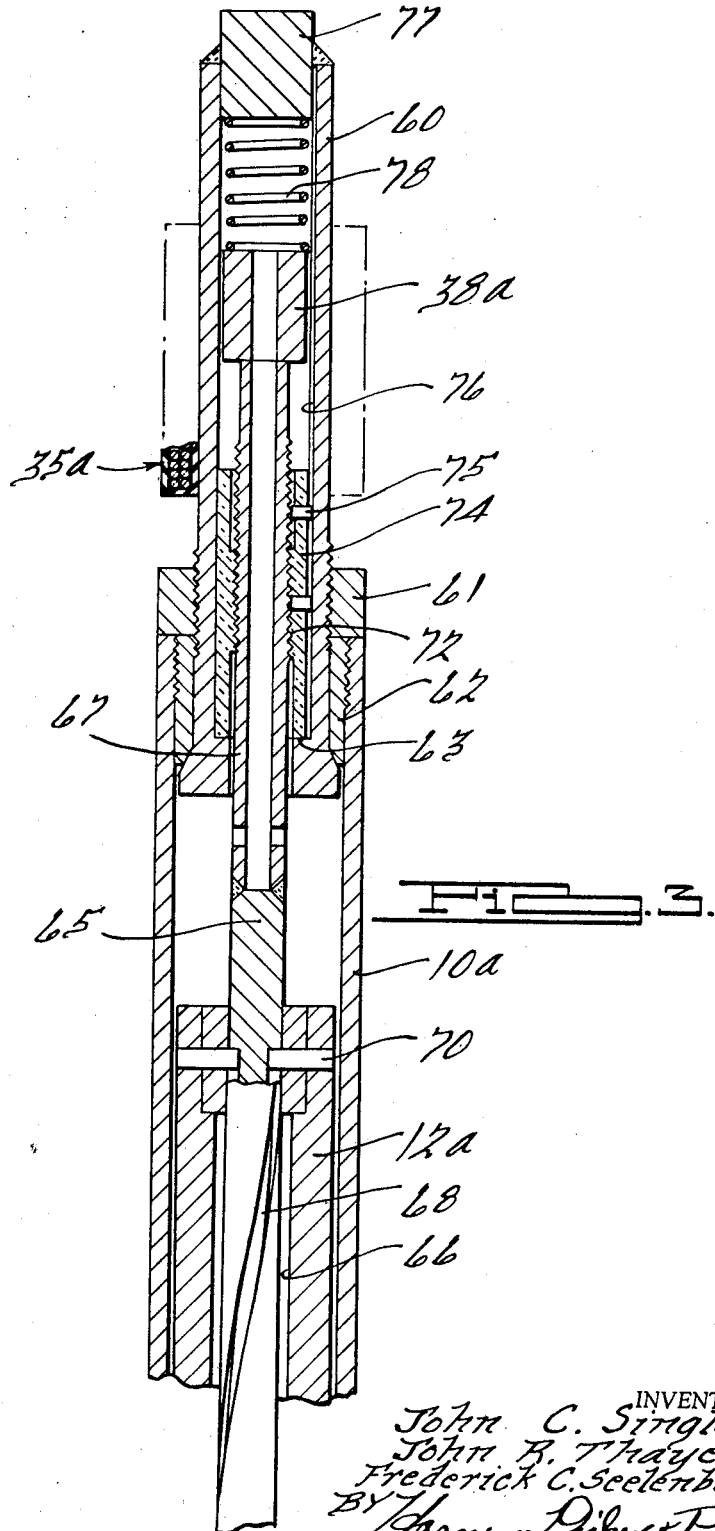

3,492,616
POSITION INDICATOR
John C. Singleton and John R. Thayer, Lancaster, Ohio, and Frederick C. Seelenbinder, Ellenton, Fla., assignors to Diamond Power Specialty Corporation, Lancaster, Ohio, a corporation of Ohio
Filed Sept. 15, 1966, Ser. No. 579,606
Int. Cl. H01f 21/02, 27/02, 21/06
U.S. Cl. 336—30                             3 Claims

ABSTRACT OF THE DISCLOSURE

A position indicator transmitter for the control rods of nuclear reactors employs a two-part casing structure having two coaxial mating cavities of circular cross section, one cavity formed in a casing section which contains mechanical drive means connected to the control rod drive to sense its position and in one embodiment comprising gear and rack members and in another embodiment a helically slotted member, said members turning threaded parts to move an armature which constitutes the core of a linear differential transformer. The armature is slidable in a sleeve which projects into the cavity in the other section but is sealed and isolated therefrom and forms an integral extension of the enclosure defined by the cavity which contains the mechanical drive means. The windings of the transformer are arranged on the outside of such sleeve and an axial openable closure is provided in such other casing section through which the windings can be removed and replaced without destroying the integrity of the cavity and extension sleeve which contain the mechanical drive means and armature.

---

The present invention relates to position indicating systems, and particularly to improved means for accurately indicating at a remote point the position of a movable object which is not directly visually observable. The invention finds particular utility in connection with systems where a closely confined and normally inaccessible element is involved, such as a control rod of a nuclear reactor. In the operation of the control rods employed for controlling the neutron flux and power level of nuclear reactors of the pressurized water or boiling water type, a plurality of closely spaced vertically displaceable control rods are employed driveable individually or in groups within the reactor vessel and operating in complete darkness and in a closed and sealed system. In such installations the control rods and the entire control rod driving means, and all accessory apparatus pertaining thereto, must be completely sealed, but it is important that an accurate and completely reliable indication as to the exact position of each control rod be available to the operating staff at all times. A further factor is that space is at a premium, particularly between control rod drives in an array of many serving a large reactor.

The present invention has as its primary objective the provision of an improved position indicator of extremely compact and reliable character, which furnishes a continuous indication of the exact location of a monitored device such as a control rod which is movable through a relatively long linear travel, the system comprising a transmitter and a readout station, the latter being locatable at a position remote from the transmitter and connected to the transmitter by a single electric cable, and the transmitter consisting of a single casing assembly of modular character having a mechanically actuable sensing element completely sealed therewithin and an electrical transducer controllable by the mechanical sensing element, the transducer being carried by the housing but designed and installed in such manner that all parts which could burn out or fail due to an electrical overload are accessibly located outside a sealed integrious enclosure defined by the interior of the transmitter housing and the control rod drive enclosure. A related object is the provision of such a system which employs no movable seals or sealing parts.

Other objects and advantages will become apparent upon consideration of the present disclosure in its entirety.

In the drawing:

FIGURE 1 is a diametric longitudinal sectional view of our position indicating transmitter;

FIGURE 2 is a schematic diagram of the electrical components of the system including the readout or indicator station, and FIGURE 3 is a diametric longitudinal sectional view of a modified construction.

Referring now to the drawing, reference character 10 designates generally a portion of the tubular housing of a control rod drive assembly which is ordinarily installed in vertically upstanding position upon the head of a reactor vessel (not shown), the interior of the tubular housing assembly 10 communicating with the interior of the reactor vessel but being sealed from the outside atmosphere. A rack 12 is vertically displaceable within the housing 10 by suitable driving motor means (not shown). While the motor means is subject to variation, and forms no part of the present invention, it is desirable in most installations that it be of minimum lateral dimensions and completely sealed to maintain the sealed integrity of the system. A suitable driving motor is disclosed in the copending application of Singleton, McCullough and Hartz, Ser. No. 555,413, filed June 6, 1966. At its lower end the rack 12 is coupled to a control rod (not shown), the rack and rod moving axially as a unit when the rack is actuated, to alter the neutron flux of the reactor.

The position indicator transmitter comprises a main housing and supporting body 15 formed of a suitable noncorrosive metal. The body 15 is tightly secured to and sealed with respect to the upper and lower sections 11 and 13 of the housing and drive assembly 10, and a chamber 16 within the body 15 communicates with the upper and lower sections 11 and 13 and extends axially through the body 15 to permit free passage of the rack 12 therethrough. The passage 16 is also sufficiently enlarged laterally to accommodate and permit the free rotation therein of a pinion 20 which meshes at all times with and is driveable by the rack. The pinion 20 is journaled on an axis perpendicular to the rack on a bearing bushing 21 formed on an axially apertured stepped cylindrical gear support 22, rigidly positioned in the body. The gear support 22 is externally threaded and tightly screwed into a removable cap-like body portion 25 and its axial passage 23 is internally threaded near its left end as shown in FIGURE 1 at 24.

The cap portion 25 of the body 15 is flanged and is tightly secured and sealed with respect to the main body portion 15 by cap screws 26 and gasketing 27, 28. The cap portion 25 is provided with a stepped central bore 30 coaxial with the bore 23 in the gear support 22. The bore 30 is enlarged in the laterally projecting portion 32 of the cap section 25 and terminates in an open end closed by a movable screw cap 33.

The cap portion 25 houses within the bore 30 a linearly variable differential transformer assembly generally designated 35. Such transformer includes a single primary winding 40 and two secondaries 47, the secondary windings being in series with each other but wound in opposite directions. The windings are carried by a cylindrical spool 36 of nonmagnetic material, within which is arranged an axially slidable core 38 formed of magnetic material. The core acts as an armature to vary the output of the transformer and the arrangement is such that the two secondary coils being in series but wound in opposite directions, their induced output voltages are 189° out of phase and substantially nullify each other when the armature core is centered in the windings. When the armature is displaced to either side of the centered zero output position, the coil toward which the armature is displaced generates a higher voltage and the coil from which the armature is partially withdrawn produces a lower voltage, the difference between the two outputs constituting the output voltage, which can be read on a voltmeter. In the present system, as shown in FIGURE 2, the primary winding 40 is fed from a suitable AC source, and the DC voltmeter 42 is connected to the output of a full-wave rectifier 43 fed from the secondary windings 47 so as to respond linearly to the output voltage. Such voltage is a linear function of the position of the core within a certain range, and therefore of the control rod, and the meter, calibrated in linear increments, shows the position of the control rod.

A tubular enclosure and guide 44 for the slidable armature 38 is interposed between the armature and the spool 36. The guide 44 is formed of nonmagnetic metal, is closed by an integral wall at its outer end, and its open right end is peripherally sealed as by welding in a suitable seat formed in the counterbore in cap portion 25 in which the support 22 is fitted. Thus the interior chamber 45 of the guide 44 constitutes a sealed continuation of the internal chamber 16 and the space within the main housing 10, and all of such internal areas are effectively sealed off from atmosphere.

The armature core 38 is displaceable by and in proportion to linear travel of the rack 12. As shown in FIGURE 1, the right end of the core is rigidly attached to an axially positioned actuating screw 46 rotatable by the gear 20. The screw is threadably interengaged with internal threads 24 in the support plug 22, while the right end of the actuating screw is provided with an elongated rectangular keying portion 50 which is accurately slidably fitted in a conformably shaped axially positioned opening 52 in a plate 54 secured to and rotatable with the gear 20. The main body portion 15 is provided with a blind clearance hole 55 into which the keying portion 50 projects when the armature is in the right hand position. Since the plug 22 is fixed in position (and preferably locked in place as by set screw 49) rotation of the screw 46 by the gear 20 actuates the armature core longitudinally to vary the output of the transformer in the manner described. The initial position of the core armature at the minimum output position, may correspond to one extremity of the travel of the rack and control rod, as for example, the fully raised position. The voltmeter is calibrated in linear increments in such manner that as the rack is moved downwardly and the core is correspondingly drawn away from the centered position, the voltmeter reading indicates the position of the control rod.

It will be noted that when the cap 33 is removed, the entire coil assembly and electrical structure of the transformer is accessible and can be removed and replaced in event of a failure without breaking a seal or violating the integrity of the system. The coil assembly is accurately maintained in its linear positioning by a spring 58 under the cap 33. Passages as 59 in the gear support plug 22 provide communication between chambers 16–45 to prevent any pressure differential.

The modified construction shown in FIGURE 3 is adapted to be installed on the upper end of a control rod drive, rather than projecting laterally from an intermediate area, and is so designed as to consume no space in a transverse dimension. It will be seen also to differ from the first embodiment in that whereas the first embodiment is adapted for use with a system wherein the control rod is driven by a rack, the embodiment of FIGURE 3 is adapted for use with a control rod drive of another known type wherein the rod (not shown) is connected to and actuatable by a tubular hollow shaft 12a which is keyed against axial rotation and adapted to be moved axially by suitable driving means (not shown) within an enclosure in the form of a tubular housing 10a. Only the upper portion of the housing is illustrated, the actuating shaft 12a being shown in its upper position which corresponds to the raised position of the control rod.

The upper end of the tubular housing 10a supports a coaxial tubular upwardly projecting extension housing portion 60 of reduced diameter which is sealed with respect to the main housing 10a, to which it is attached by nut and collar means 61, 62.

The tubular casing portion 60 has an inturned bottom flange 63 defining a shoulder on which rests a nut 74. Nut 74 is held against turning by pins 75 which project therefrom into a slot 76 in the internal wall of tubular casing member 60. An axially positioned shaft generally designated 65 is threadably interfitted with the nut and extends downwardly into the central opening 66 of the hollow shaft 12a a distance somewhat exceeding the longitudinal travel of shaft 12a, so that shaft 12a, when in its lowermost position (not shown) is still over-engaged with shaft 65. The surface of shaft 65 is provided with a pair of helical grooves 68 which lie at a low helix angle, and keying pins 70 in shaft 12a extend into and are slidable in the grooves 68 and act to rotate shaft 65 as shaft 12a moves longitudinally. In a practical embodiment of this invention, the helical grooves 68 have a pitch corresponding to one full revolution in nine inches.

Shaft 65 is rotatable as well as axially movable and a rigidly attached upper portion 67 thereof projects upwardly into extension housing portion 60, where it is provided with external threads 72 meshing with the internal threads of nut 74. Such threads are of higher pitch (e.g., 9 threads per inch) than the grooves 68 and when shaft 65 is rotated by pins 70 it climbs or moves downwardly in the fixedly positioned nut 74, depending upon the direction of rotation imparted to shaft 65, which is in turn dependent upon the direction of axial movement of the slidable but non-rotatable shaft 12a. The slidable core 38a, which corresponds in function to the core 38 of the first described embodiment is thereby actuated upwardly or downwardly as the case may be.

Movement of the core portion 38a controls the output of a transformer winding assembly 35a corresponding to the transformer winding 35 of the first embodiment, winding 35a being rigidly positioned upon the outside of housing portion 60. The upper end of housing portion 60 is closed and sealed by a welded plug 77, and a compression spring 78 trapped between the plug and the core 38a assures accurate positioning of the core in conformity to the position of the rod and the shaft 12a.

While it will be apparent that the embodiments of the invention herein disclosed are well calculated to fulfil the objects of the invention, it will be appreciated that the invention is susceptible to modification, variation and change without departing from the proper scope or fair meaning of the subjoined claims.

What is claimed is:

1. A position indicating transmitter comprising a casing assembly defining a sealed enclosure, an armature core of magnetizable material movably supported in the enclosure, means for moving the armature core in response and conformably to movements of an object whose position is to be indicated, and a transformer assembly located outside the enclosure including winding portions having magnetic coupling variable by movement of the armature core, said casing assembly comprises two casing parts, each part having a cavity which opens in one face thereof and said parts being secured together at said faces with said cavities aligned, said enclosure being defined partly by one of said cavities and partly by a sleeve sealing said last-mentioned cavity in one part and extending into the cavity in the other part, the winding portions being slidably mounted on said sleeve, means for locating the winding portions on the sleeve, said other part having a port axially aligned with said sleeve and winding portions and through which the winding portions may be inserted and removed, and a removable closure for said port.

2. A position indicator transmitter as defined in claim 1 wherein the armature core is movable longitudinally in said sleeve, the means for moving the armature core including a gear in said sealed cavity rotatable upon an axis concentric with the sleeve, the sleeve being formed of non-magnetic material and the winding portions surrounding said sleeve.

3. A position indicator transmitter as defined in claim 1 wherein said windings and said armature core coact to define a transformer having output voltage characteristics which vary in substantially linear relation with respect to and in response to longitudinal displacement of the armature core.

References Cited

UNITED STATES PATENTS

| | | | |
|---|---|---|---|
| 2,053,077 | 9/1936 | Harrison | 336—30 XR |
| 2,236,151 | 3/1941 | Marzetti | 336—136 XR |
| 2,465,032 | 3/1949 | Neff | 336—30 |
| 2,469,137 | 5/1949 | Strong | 336—30 |
| 2,596,361 | 5/1952 | Blancher. | |
| 3,138,772 | 6/1964 | Persons | 336—136 |
| 3,142,794 | 7/1964 | Pegram | 336—136 |
| 3,221,281 | 11/1965 | Roeger | 336—136 XR |
| 3,308,411 | 3/1967 | Roshala | 336—30 |

LEWIS H. MYERS, Primary Examiner

U.S. Cl. X.R.

336—92, 136

UNITED STATES PATENT OFFICE
CERTIFICATE OF CORRECTION

Patent No. 3,492,616                                          January 27, 1970

John C. Singleton et al.

It is certified that error appears in the above identified patent and that said Letters Patent are hereby corrected as shown below:

Column 3, line 2, "189°" should read -- 180° --. Column 6 after line 7, insert -- 3,099,823  7/1963  Bobula et al -------  336-132XR --.

Signed and sealed this 1st day of December 1970.

(SEAL)
Attest:

Edward M. Fletcher, Jr.

Attesting Officer

WILLIAM E. SCHUYLER, JR

Commissioner of Patents